(12) United States Patent
Tzou et al.

(10) Patent No.: US 11,036,254 B2
(45) Date of Patent: Jun. 15, 2021

(54) PORTABLE ELECTRONIC DEVICE AND FOLDABLE ELECTRONIC INPUT DEVICE

(71) Applicants: Jyh-Chyang Tzou, Taipei (TW); Hsiao-Wen Tseng, Taipei (TW); Yi-Hsun Liu, Taipei (TW); Yao-Hsien Yang, Taipei (TW); Han-Tsai Liu, Taipei (TW)

(72) Inventors: Jyh-Chyang Tzou, Taipei (TW); Hsiao-Wen Tseng, Taipei (TW); Yi-Hsun Liu, Taipei (TW); Yao-Hsien Yang, Taipei (TW); Han-Tsai Liu, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 16/365,700

(22) Filed: Mar. 27, 2019

(65) Prior Publication Data
US 2019/0302840 A1 Oct. 3, 2019

Related U.S. Application Data

(60) Provisional application No. 62/651,696, filed on Apr. 2, 2018.

(51) Int. Cl.
*G06F 1/16* (2006.01)
*G06F 3/041* (2006.01)
*G06F 3/042* (2006.01)

(52) U.S. Cl.
CPC .......... *G06F 1/1616* (2013.01); *G06F 1/1643* (2013.01); *G06F 3/042* (2013.01); *G06F 3/0412* (2013.01)

(58) Field of Classification Search
CPC .............................. G06F 1/1643; G06F 3/0412
See application file for complete search history.

(56) References Cited

U.S. PATENT DOCUMENTS 5,739,810 A * 4/1998 Merkel ................. G06F 1/1616
345/156
6,256,192 B1 * 7/2001 Shannon ............... G06F 1/1616
312/223.2

(Continued)

FOREIGN PATENT DOCUMENTS

| JP | 2006174506 | 6/2006 |
| TW | 201241803 | 10/2012 |

OTHER PUBLICATIONS

"Office Action of Taiwan Counterpart Application," dated Mar. 23, 2020, p. 1-p. 10.

*Primary Examiner* — Adrian S Wilson
(74) *Attorney, Agent, or Firm* — JCIPRNET

(57) ABSTRACT

A foldable electronic input device having a folded mode and an unfolded mode is provided. The foldable electronic input device includes a first body having a first surface and a second surface opposite to the first surface and a second body having a third surface. A first input area and a second input area are disposed on the first surface and the second surface, respectively. The third input area is disposed on the third surface. When in the folded mode, the second body is located directly below the first body and the third surface faces the second surface. When in the unfolded mode, the first body is located beside the second body, the second surface forms a plane with the third surface, and the second input area and the third input area constitute a fourth input area. A portable electronic device including the foldable electronic input device is also provided.

18 Claims, 11 Drawing Sheets

(56) References Cited

U.S. PATENT DOCUMENTS

| | | | | |
|---|---|---|---|---|
| 6,297,945 B1* | 10/2001 | Yamamoto | G06F 1/1616 | 312/223.1 |
| 6,341,061 B1* | 1/2002 | Eisbach | G06F 1/1616 | 312/223.2 |
| 6,421,235 B2* | 7/2002 | Ditzik | G06F 1/1616 | 320/114 |
| 6,480,373 B1* | 11/2002 | Landry | G06F 1/1616 | 16/308 |
| 6,643,124 B1* | 11/2003 | Wilk | G06F 1/1616 | 312/223.1 |
| 6,898,073 B2* | 5/2005 | Lin | G06F 1/1616 | 361/679.08 |
| 7,010,333 B2* | 3/2006 | Trively | H04M 1/0214 | 379/433.01 |
| 7,061,472 B1* | 6/2006 | Schweizer | G06F 1/162 | 345/156 |
| 7,489,503 B2* | 2/2009 | Maatta | G06F 1/1616 | 16/367 |
| 7,869,843 B2* | 1/2011 | Ladouceur | H04M 1/0247 | 361/679.21 |
| 7,990,702 B2* | 8/2011 | Tracy | G06F 1/1616 | 361/679.55 |
| 8,203,832 B2* | 6/2012 | Szabolcsi | G06F 1/169 | 361/679.06 |
| 8,289,687 B2* | 10/2012 | Weinstein | G06F 1/1677 | 361/679.3 |
| 8,331,098 B2* | 12/2012 | Leung | G06F 1/1618 | 361/715 |
| 8,624,844 B2* | 1/2014 | Behar | G06F 1/162 | 345/169 |
| 8,787,016 B2* | 7/2014 | Rothkopf | H04M 1/0216 | 361/679.55 |
| 8,803,816 B2* | 8/2014 | Kilpatrick, II | G06F 1/1616 | 345/173 |
| 9,077,792 B1* | 7/2015 | Alhaidar | H04M 1/0266 | |
| 9,176,535 B2* | 11/2015 | Bohn | G06F 1/1641 | |
| D750,036 S* | 2/2016 | Endo | D14/126 | |
| 9,295,168 B2* | 3/2016 | Baek | H05K 5/0017 | |
| 9,386,300 B2* | 7/2016 | Lee | H04N 5/247 | |
| 10,503,215 B1* | 12/2019 | Quinn | G06F 1/1681 | |
| 2002/0141146 A1* | 10/2002 | Mustoe | G06F 1/1616 | 361/679.04 |
| 2004/0160736 A1* | 8/2004 | Lin | G06F 1/1616 | 361/679.04 |
| 2006/0012563 A1* | 1/2006 | Fyke | G06F 1/1616 | 345/156 |
| 2006/0050169 A1* | 3/2006 | Misawa | G06F 1/1616 | 348/333.06 |
| 2007/0004475 A1* | 1/2007 | Kuo | H04M 1/0214 | 455/575.3 |
| 2007/0097014 A1* | 5/2007 | Solomon | G06F 1/1616 | 345/1.1 |
| 2008/0253073 A1* | 10/2008 | Kee | G06F 1/1616 | 361/679.04 |
| 2009/0190295 A1* | 7/2009 | Chin | G06F 1/1618 | 361/679.27 |
| 2010/0064536 A1* | 3/2010 | Caskey | G06F 1/1616 | 33/303 |
| 2010/0085274 A1* | 4/2010 | Kilpatrick, II | G06F 1/1616 | 345/1.3 |
| 2010/0277439 A1* | 11/2010 | Charlier | G06F 1/1616 | 345/176 |
| 2012/0002360 A1* | 1/2012 | Seo | G06F 1/1616 | 361/679.01 |
| 2012/0014054 A1* | 1/2012 | Ashcraft | G06F 1/1626 | 361/679.26 |
| 2012/0314359 A1* | 12/2012 | Hsieh | G06F 1/1616 | 361/679.12 |
| 2014/0011548 A1* | 1/2014 | Varela | H04B 1/3888 | 455/566 |
| 2019/0220061 A1* | 7/2019 | Fujimoto | G06F 1/1618 | |

* cited by examiner

PORTABLE ELECTRONIC DEVICE AND FOLDABLE ELECTRONIC INPUT DEVICE

CROSS REFERENCE TO RELATED APPLICATION

This application claims the priority benefit of U.S. provisional application Ser. No. 62/651,696, filed on Apr. 2, 2018. The entirety of the above-mentioned patent application is hereby incorporated by reference herein and made a part of specification.

BACKGROUND OF THE INVENTION

Field of the Invention

The invention relates to an electronic device, and more particularly, to a portable electronic device and a foldable electronic input device.

Description of Related Art

With the advancement of technology, portable electronic devices have become conventional electronic devices in daily life because of their thin size and light weight. Current electronic devices have a variety of input devices as human-computer interaction, such as a keyboard, a mouse, and a touchpad. In particular, the touch interface is one of the most user-friendly human-computer interfaces. With the advancement of touch technology, the sensitivity of touch technology has increased and more intuitive handwriting touch technology has been more favored by consumers. However, a mainstream of portable electronic devices does not fully integrate the handwriting touchpad. For example, a notebook computer requires an external handwriting touchpad, so the user has to carry a handwriting touchpad which increases the baggage burden. Besides, the current portable electronic device provides a limited touch space to reduce the size, which is inconvenient to the user when drawing or writing. Therefore, how to provide an electronic input device having a sufficient touch space and also with enough small size to be integrated into a portable electronic device has become an important issue.

SUMMARY OF THE INVENTION

The invention provides a portable electronic device and a foldable electronic input device, which the foldable electronic input device may be applied to the portable electronic device. The foldable electronic input device has a folded mode and an unfolded mode and may be integrated into the portable electronic device. When the foldable electronic input device is in the folded mode, the foldable electronic input device may be fully integrated into the portable electronic device to keep the volume of the portable electronic device unchanged. When the foldable electronic input device is in the unfolded mode, the foldable electronic input device may provide a sufficient touch input area for a user to operate conveniently.

An embodiment of the invention provides a foldable electronic input device having a folded mode and an unfolded mode and including a first body and a second body. The first body has a first surface and a second surface opposite to the first surface and includes a first input area disposed on the first surface and a second input area disposed on the second surface. The second body has a third surface and includes a third input area disposed on the third surface. When the foldable electronic input device is in the folded mode, the second body is located directly below the first body, and the third surface faces the second surface. When the foldable electronic input device is in the unfolded mode, the first body is located beside the second body, the second surface forms a plane with the third surface, and the second input area and the third input area constitute a fourth input area.

An embodiment of the invention provides a portable electronic device including a foldable electronic input device and a display device. The foldable electronic input device has a folded mode and an unfolded mode and includes a first body, a second body, and a third body. The first body has a first surface and a second surface opposite to the first surface and includes a first input area disposed on the first surface and a second input area disposed on the second surface. The second body has a third surface and includes a third input area disposed on the third surface. The third body has a fourth surface and includes a computing device and a fifth input area. The computing device is disposed inside the third body and electrically connected to the first input area, a fourth input area, and the fifth input area, wherein in the unfolded mode, the second surface forms a plane with the third surface, and the second input area and the third input area constitute the fourth input area. The fifth input area is disposed on the fourth surface. When the foldable electronic input device is in the folded mode, the second body is located directly below the first body and the third surface faces the second surface, the first body and the second body are located at a same side of the third body, and the first surface is aligned with the fourth surface. When the foldable electronic input device is in the unfolded mode, the first body is located beside the second body and the second body is located between the first body and the third body. The display device is coupled to the foldable electronic input device and electrically connected to the computing device.

Based on the above, the foldable electronic input device of an embodiment of the invention has the folded mode and the unfolded mode and may be integrated into the portable electronic device. When the foldable electronic input device is in the folded mode, the first body is stacked on the second body and the first input area on the first surface of the first body is provided to the user for operation. The second input area on the second surface of the first body is opposite to the third input area on the third surface of the second body. When the foldable electronic input device is in the unfolded mode, the first body and the second body are spread out, the first surface is turned down, and the second surface is aligned with the third surface such that the second input area forms an enlarged input area with the third input area, which is convenient for the user to operate.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
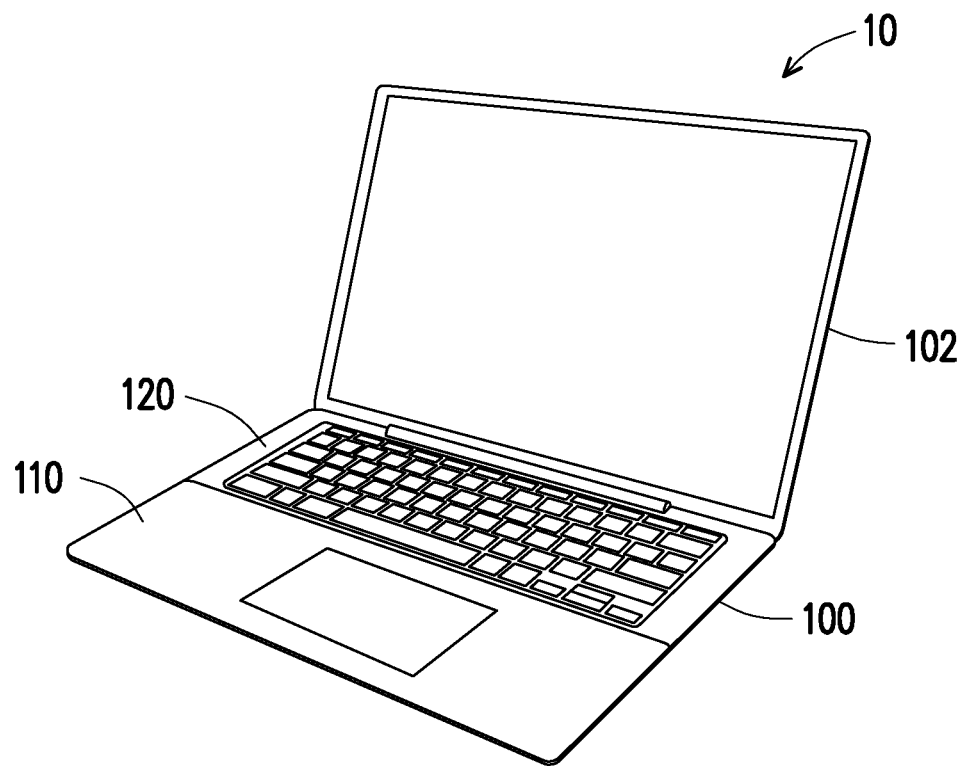
FIG. 1 is a schematic diagram of a foldable electronic input device of a portable electronic device in a folded mode in accordance with an embodiment of the invention.
Figure 2:
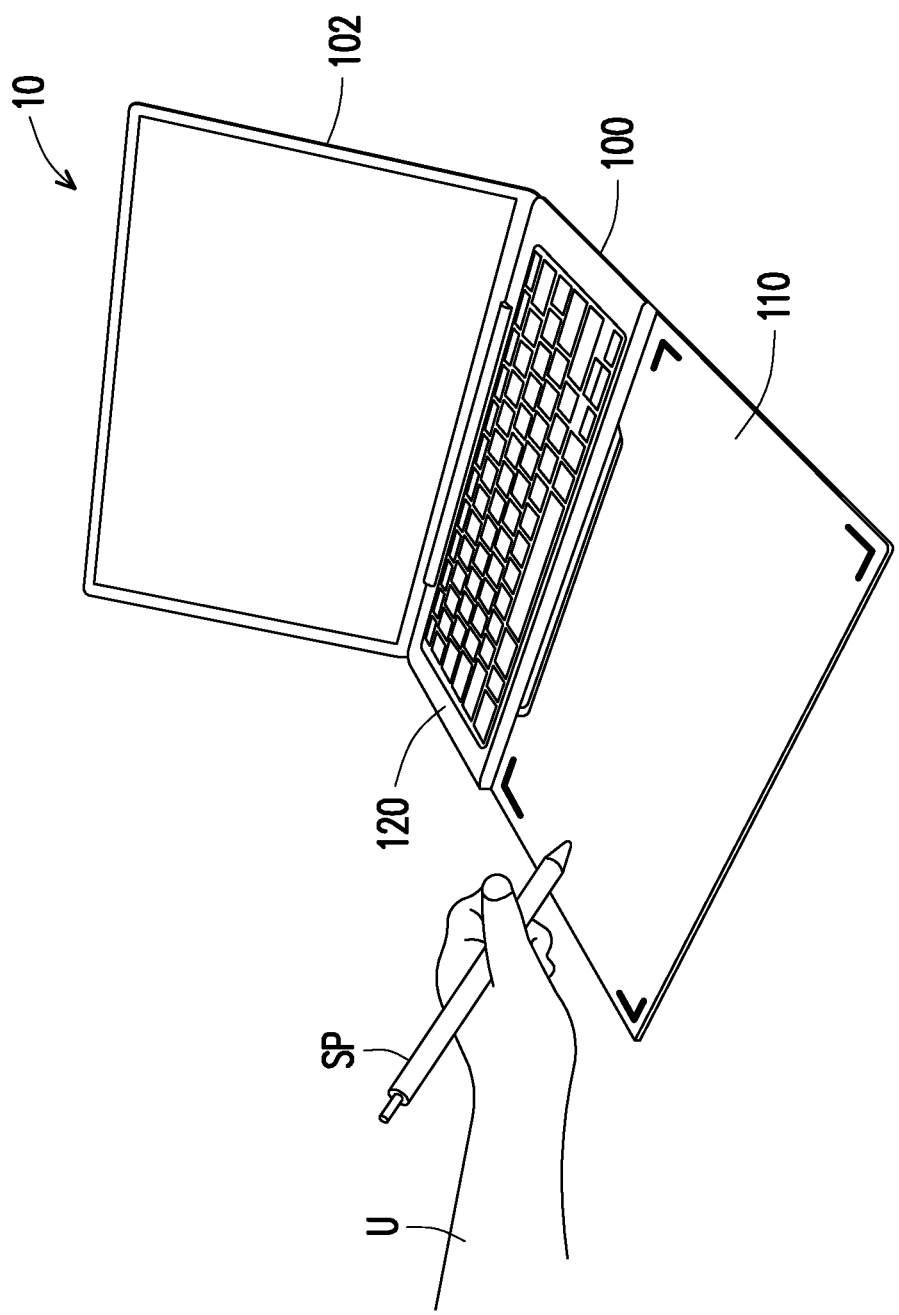
FIG. 2 is a schematic diagram of the foldable electronic input device of the portable electronic device in an unfolded mode in accordance with the embodiment of FIG. 1 of the invention.

FIG. 1 is a schematic diagram of a foldable electronic input device of a portable electronic device in a folded mode in accordance with an embodiment of the invention, and FIG. 2 is a schematic diagram of the foldable electronic input device of the portable electronic device in an unfolded mode in accordance with the embodiment of FIG. 1 of the invention. Referring to FIG. 1 and FIG. 2, in the present embodiment, a portable electronic device 10 is, for example, a notebook computer, and includes a foldable electronic input device 100 and a display device 102. The foldable electronic input device 100 includes a foldable portion 110 and a host portion 120, wherein the foldable portion 110 has a folded mode and an unfolded mode. As shown in FIG. 1, when the foldable portion 110 is in the folded mode, the appearance of the foldable electronic input device 100 is similar to the host body of the existing notebook computer, both having a keyboard and a touchpad. As shown in FIG. 2, when the foldable portion 110 is in the unfolded mode, the foldable electronic input device 100 is unfolded so that the area initially including the touchpad becomes a handwriting drawing board that can be written or drawn by a user U with a stylus SP, and the part having the keyboard remains unchanged.

Figure 3A:
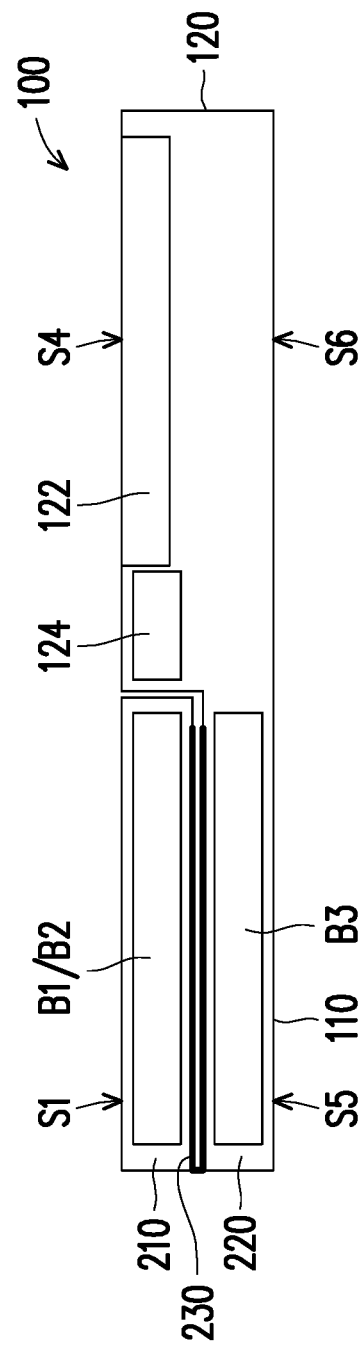
FIG. 3A is a side view of the foldable electronic input device in accordance with the embodiment of FIG. 1 of the invention.
Figure 3B:
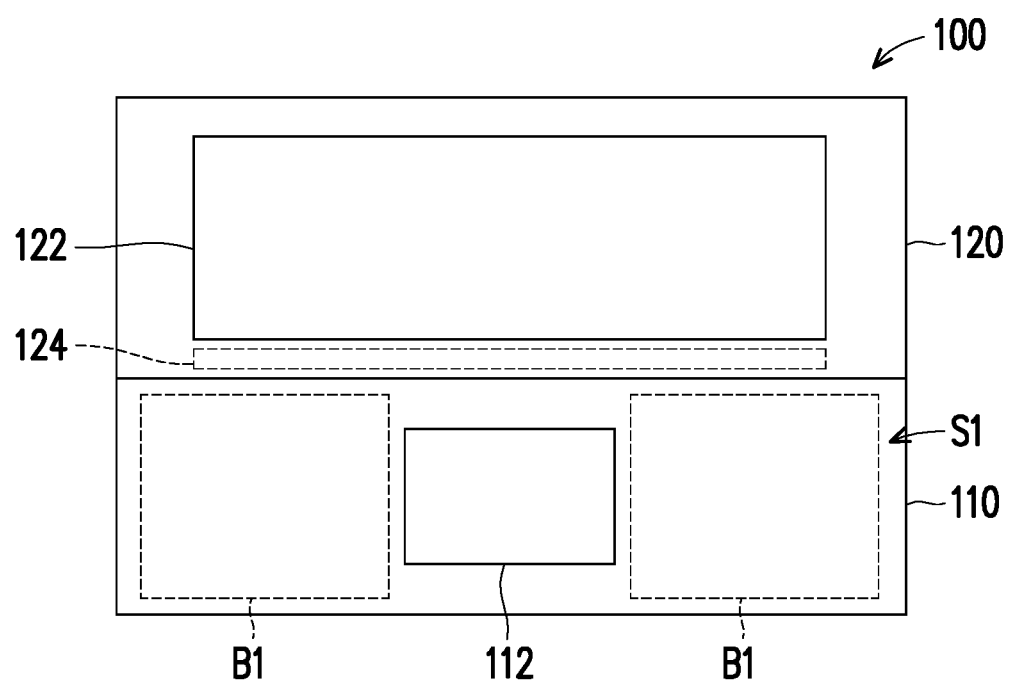
FIG. 3B is a top view of the foldable electronic input device in accordance with the embodiment of FIG. 3A of the invention.
Figure 4A:
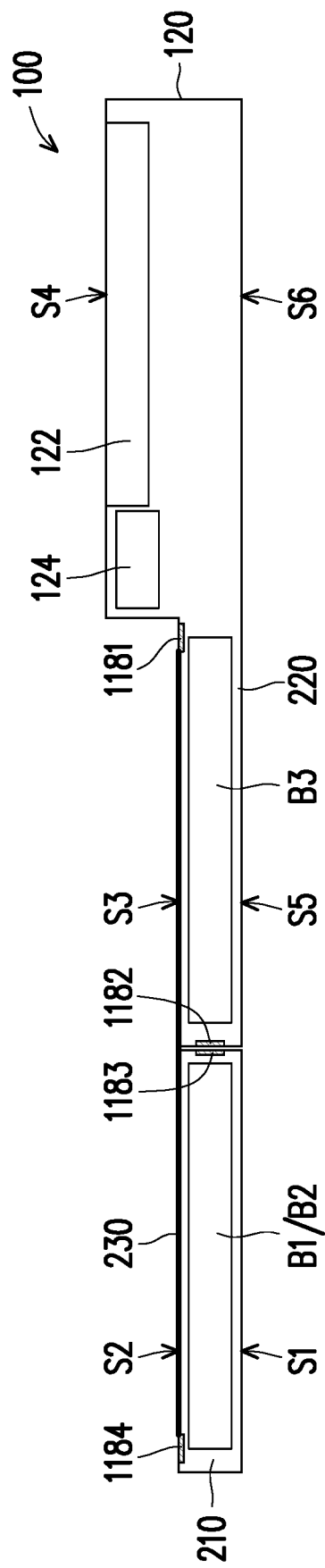
FIG. 4A is a side view of the foldable electronic input device in accordance with the embodiment of FIG. 2 of the invention.
Figure 4B:
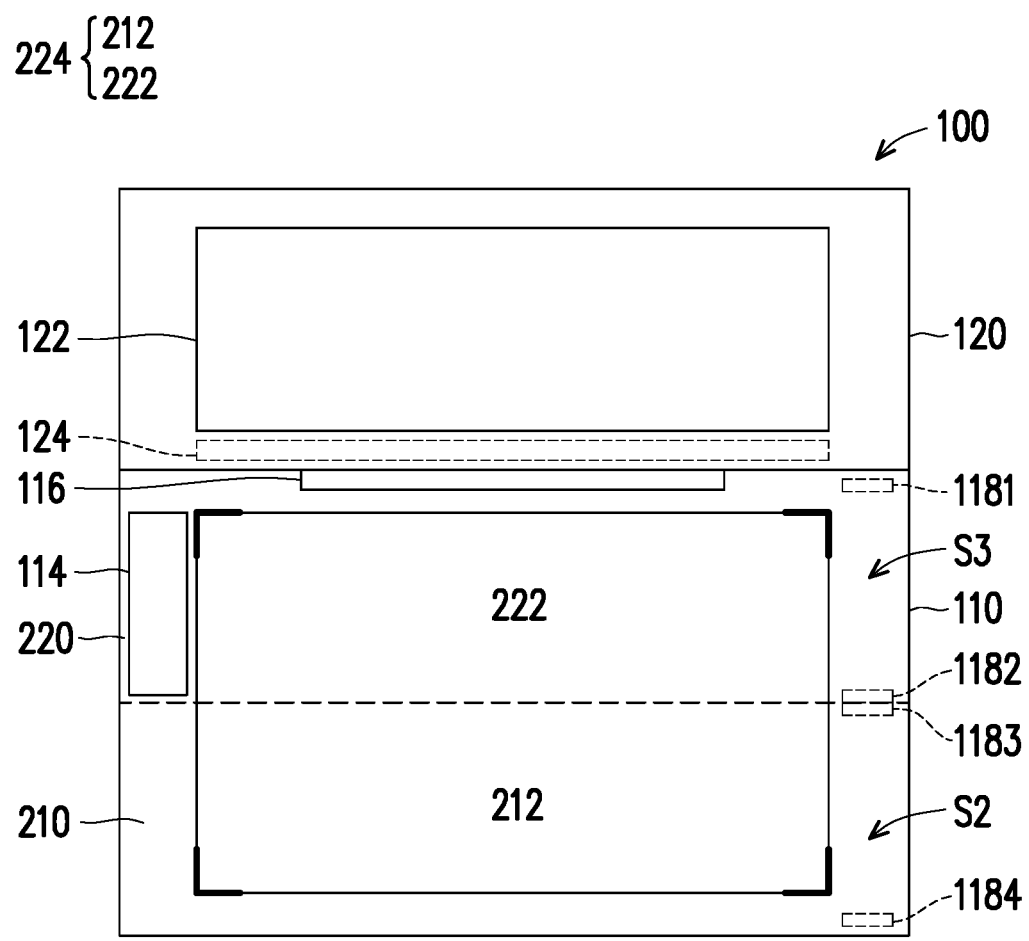
FIG. 4B is a top view of the foldable electronic input device in accordance with the embodiment of FIG. 4A of the invention.

FIG. 3A and FIG. 3B are schematic views of the foldable electronic input device at different viewing angles in accordance with the embodiment of FIG. 1 of the invention, and FIG. 4A and FIG. 4B are schematic views of the foldable electronic input device at different angles in accordance with the embodiment of FIG. 2 of the invention. Please continue to refer to FIG. 3A to FIG. 4B to further illustrate the embodiment of the foldable electronic input device 100. It should be noted that, in order to make the drawings simple, some of the drawings in FIG. 3A to FIG. 4B will omit to show the remarks of some components, but by referring to FIG. 3A to FIG. 4B, it will be clear to those of ordinary skill in the art to understand the structure of the foldable electronic input device 100.

In detail, the foldable portion 110 of the foldable electronic input device 100 includes a first body 210 and a second body 220, and the host portion 120 may be regarded as a third body of the foldable electronic input device 100. The second body 220 and the third body may be independent bodies, or may be two parts of a single body formed integrally. The first body 210 has a first surface S1 and a second surface S2 opposite to the first surface S1 and includes a first input area 112 and a second input area 212. The first input area 112 is disposed on the first surface S1, and the second input area 212 is disposed on the second surface S2. An area of the first input area 112 is different from an area of the second input area 212. The second body 220 has a third surface S3 and includes a third input area 222. The third input area 222 is disposed on the third surface S3. Also, the host portion 120 has a fourth surface S4 and includes a fifth input area 122. The fifth input area 122 is disposed on the fourth surface S4.

As shown in FIG. 3A and FIG. 3B, when the foldable electronic input device 100 is in the folded mode, the second body 220 is located directly below the first body 210, and the third surface S3 faces the second surface S2. The first body 210 and the second body 220 is located at the same side of a host portion 120, and the first surface S1 is aligned with the fourth surface S4, i.e., located on the same plane.

As shown in FIG. 4A and FIG. 4B, when the foldable electronic input device 100 is in the unfolded mode, the first body 210 is located beside the second body 220 and the second body 220 is located between the first body 210 and the host portion 120. The second surface S2 forms a plane with the third surface S3 and the second input area 212 and the third input area 222 constitute a fourth input area 224.

To place the portable electronic device 10 stable or to optimize the appearance, a fifth surface S5 of the second body 220 is aligned with a sixth surface S6 of the host portion 120, wherein the fifth surface S5 is a surface opposite to the third surface S3, and the sixth surface S6 is a surface opposite to the fourth surface S4. When the foldable electronic input device 100 is in the unfolded mode, the first surface S1 of the first body 210 is also aligned with the fifth surface S5 and the sixth surface S6.

Specifically, the portable electronic device 10 is not limited to a notebook computer. In other embodiments, the portable electronic device 10 may be a personal computer, a tablet computer, a smartphone, or other electronic devices. The display device 102 is, for example, a liquid crystal display (LCD), a light-emitting diode (LED) display, a plasma display panel, an electrophoretic display (EPD), or other types of display devices, and the invention is not limited in this regard. The host portion 120 includes a computing device. The computing device consists of a hardware device having the computing capability, such as a central processing unit (CPU), and is configured to operate the portable electronic device 10. The input areas of the foldable electronic input device 100 (e.g., the first input area 112 to the fifth input area 122) may include input devices such as a keyboard, a button, a joystick, or a touchpad.

In the present embodiment, the first input area 112, the second input area 212, the third input area 222, and the fourth input area 224 are all touch sensing areas, and the fifth input area 122 of the host portion 120 is a keyboard area, including a keyboard. Specifically, the first input area 112 includes a touchpad. The second input area 212 and the third input area 222 include touch devices to be combined into a touch device of the fourth input area 224. For example, two touchpads are spliced into an unfolded handwriting drawing board, as shown in FIG. 2. Therefore, the fourth input area 224 has a larger touch area than the first input area 112.

When the foldable electronic input device 100 is in the folded mode, the first input area 112 is enabled and the second input area 212 and the third input area 222 are disabled. The interference caused by the second input area 212 and the third input area 222 being touched accidentally may be avoided by this way since the second surface S2 and the third surface S3 face each other. When the foldable electronic input device 100 is in the unfolded mode, the second input area 212 and the third input area 222 are enabled, and the first input area 112 is disabled to avoid the mistake-touch of the first input area 112 when the first surface S1 faces downward.

It is further noted that the fifth input area 122 remains enabled regardless of whether the foldable electronic input device 100 is in the folded mode or the unfolded mode. The user may use the keyboard in both the folded mode and the unfolded mode, thus achieving the effect that the user may also use the keyboard when using the handwriting drawing board.

The second surface S2 or the third surface S3 may further include a stylus storage area or a function selection interface. In the present embodiment, a function selection interface 114 and a stylus storage area 116 are both disposed on the third surface S3, but the positions thereof are not limited. The function selection interface 114 is configured to provide a plurality of selective functions such as the different thickness of the line, different colors, different font styles, or the choices of the built-in pattern module, and the invention is not limited in this regard. The stylus storage area 116 is configured to store the stylus SP.

The foldable electronic input device 100 may also include a surface layer 230. The surface layer 230 is a flexible material capable of a folding function. The surface layer 230 is fixedly disposed above the second surface S2 and the third surface S3 and covers the second input area 212 and the third input area 222. When the foldable electronic input device 100 is in the unfolded mode, the surface layer 230 forms the fourth input area 224 in a flat connection state and serves as a medium for writing or drawing with the stylus SP. For example, the surface layer 230 is a flexible material such as a fiber cloth, a silicone, or a rubber, or a flexible display capable of a display function, such as a flexible organic light-emitting diode (FOLED) or a flexible electrophoretic display (FEPD). The invention does not limit the type of material of the surface layer 230.

It is to be noted that, in the present embodiment, the first body 210 and the second body 220 are connected to each other via the surface layer 230. In detail, the first body 210 and the second body 220 are connected to the surface layer 230 so that the first body 210 connects to the second body 220 via the surface layer 230 to be unfolded or folded. In an embodiment, the surface layer 230 may connect to the first body 210 and the second body 220 by attachment.

Figure 5A:
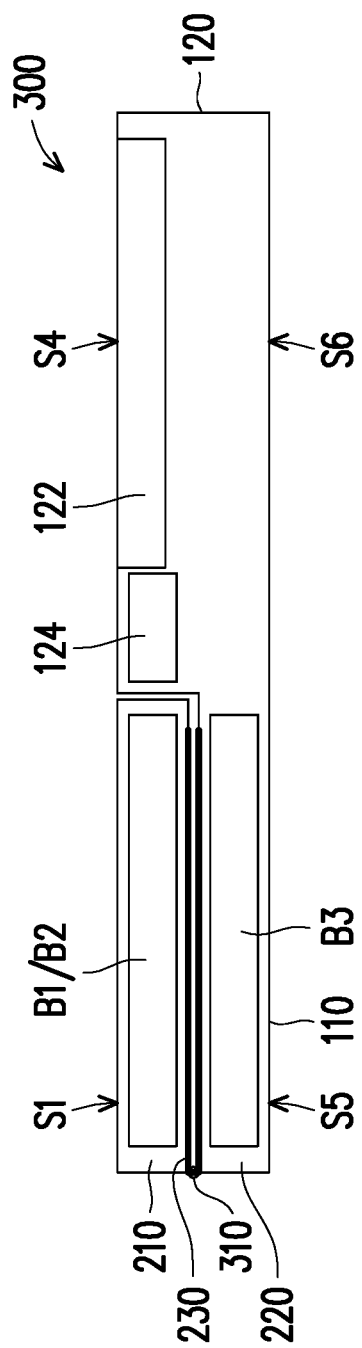
FIG. 5A is a schematic diagram of a foldable electronic input device in the folded mode in accordance with another embodiment of the invention.
Figure 5B:
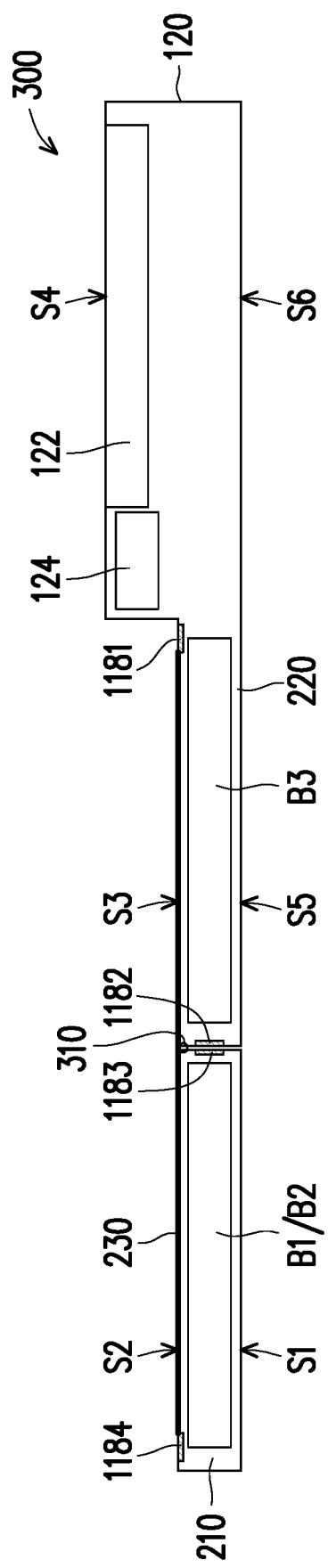
FIG. 5B is a schematic diagram of the foldable electronic input device in the unfolded mode in accordance with the embodiment of FIG. 5A of the invention.

FIG. 5A is a schematic diagram of a foldable electronic input device in the folded mode in accordance with another embodiment of the invention, and FIG. 5B is a schematic diagram of the foldable electronic input device in the unfolded mode in accordance with the embodiment of FIG. 5A of the invention. The structure and implementation of a foldable electronic input device 300 are substantially the same as the foldable electronic input device 100, but the difference is that the foldable electronic input device 300 further includes a pivoting portion 310. The pivoting portion 310 connects to the first body 210 and the second body 220 and is disposed below the surface layer 230. Compared with the connection between the first body 210 and the second body 220 of the foldable electronic input device 10 via the surface layer 230, the foldable electronic input device 300 has not only the surface layer 230 but also the pivoting portion 310. The first body 210 connects to the second body 220 via the pivoting portion 310 to unfold or fold the first body 210 and the second body 220 correspondingly. The structural configuration and implementation of the foldable electronic input device 300 are substantially the same as those of the foldable electronic input device 100 and are not repeated herein.

Referring back to the embodiments of FIG. 1 to FIG. 4B, the first body 210 may further include first batteries B1 and B2, and the second body 220 further includes a second battery B3. The two first batteries B1 and B2 of the first body 210 and the second battery B3 of the second body 220 may supply power to the computing device or the display device 102 of the host portion 120.

In detail, referring to FIG. 4A and FIG. 4B, the second body 220 further includes two second conductive connectors 1181 and 1182 that are respectively located at two opposite sides of the second body 220 along the unfolded direction of the foldable electronic input device 100. Symmetrically, the first body 210 further includes two first conductive connectors 1183 and 1184 respectively located at two opposite sides of the first body 210 along the unfolded direction of the foldable electronic input device 100. The first conductive connectors 1183 and 1184 and the second conductive connectors 1181 and 1182 are pogo pin connectors corresponding to each other, and therefore may be docked with each other in conjunction with the first body 210 and the second body 220 or disassembled.

When the foldable electronic input device 100 is in the folded mode, the first conductive connector 1184 may connect to the second conductive connector 1181 correspondingly. Through a conductive path formed by the first conductive connector 1184 and the second conductive connector 1181, the first battery B1 or the first battery B2 is connected in series with the second battery B3. When the foldable electronic input device 100 is in the unfolded mode, the first conductive connector 1183 may be docked with the second conductive connector 1182 such that the first battery B1 or the first battery B2 is connected in series with the second battery B3.

In addition, the foldable electronic input device 100 may determine whether the foldable electronic input device 100 is in the folded mode or the unfolded mode according to the docking condition of the first conductive connectors 1183 and 1184 of the first body 210 and the second conductive connectors 1181 and 1182 of the second body 220. For example, the foldable electronic input device 100 may determine that the foldable electronic input device 100 is in the folded mode based on that the first conductive connector 1184 is docked with the second conductive connector 1181. Alternatively, the foldable electronic input device 100 may determine that the foldable electronic input device 100 is in the unfolded mode based on that the first conductive connector 1183 is docked with the second conductive connector 1182.

It is to be noted that the invention does not limit the number and arrangement positions of the batteries in the first body 210 or the second body 220 and the number and arrangement positions of the first conductive connector and the second conductive connector, and the illustration of the present embodiment is only exemplary.

Figure 6:
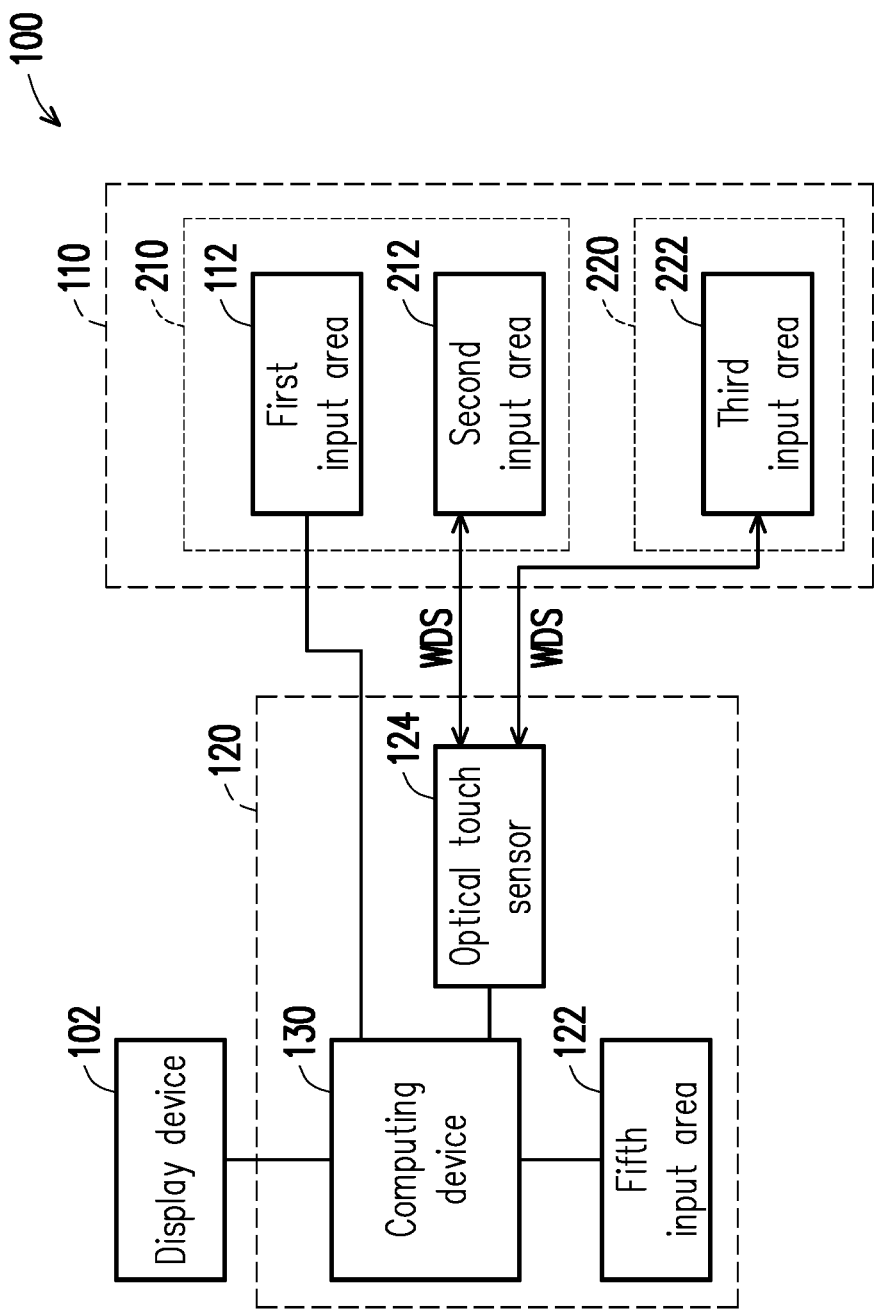
FIG. 6 is a block diagram of a portable electronic device in accordance with an embodiment of the invention.

FIG. 6 is a block diagram of a portable electronic device in accordance with an embodiment of the invention. Referring to FIG. 6, the display device 102, the first body 210, and the second body 220 are electrically connected to the computing device 130 of the host portion 120. The computing device 130 may control the display device 102. The computing device 130 may also receive and process input signals inputted by the user U via the first input area 112, the fourth input area 224, and the fifth input area 122.

The touch sensing mode of the fourth input area 224 may be an electromagnetic touch mode, a resistive touch mode, or a capacitive touch mode, and the invention is not limited in this regard. In the present embodiment, the fourth input area 224 adopts the electromagnetic touch mode or the host portion 120 further includes an optical touch sensor 124. Referring to FIG. 3A to FIG. 4B, the optical touch sensor 124 may be disposed at an edge of the host portion 120. When the foldable electronic input device 100 is in the unfolded mode, the optical touch sensor 124 is configured to detect the touch operation of the fourth input area 224. When the user performs a touch operation in the fourth input area 224 via a touch object, such as the user U uses the stylus SP to write or draw as shown in FIG. 1, the optical touch sensor 124 sends a wireless sensing signal WDS (such as an electromagnetic wave such as a laser or an infrared ray) to scan in the direction toward the user U to sense a touch event, thereby obtaining an input signal inputted by the user U in the fourth input area 224. The computing device 130 receives the input signal from the optical touch sensor 124 to execute the touch operation.

Figure 7:
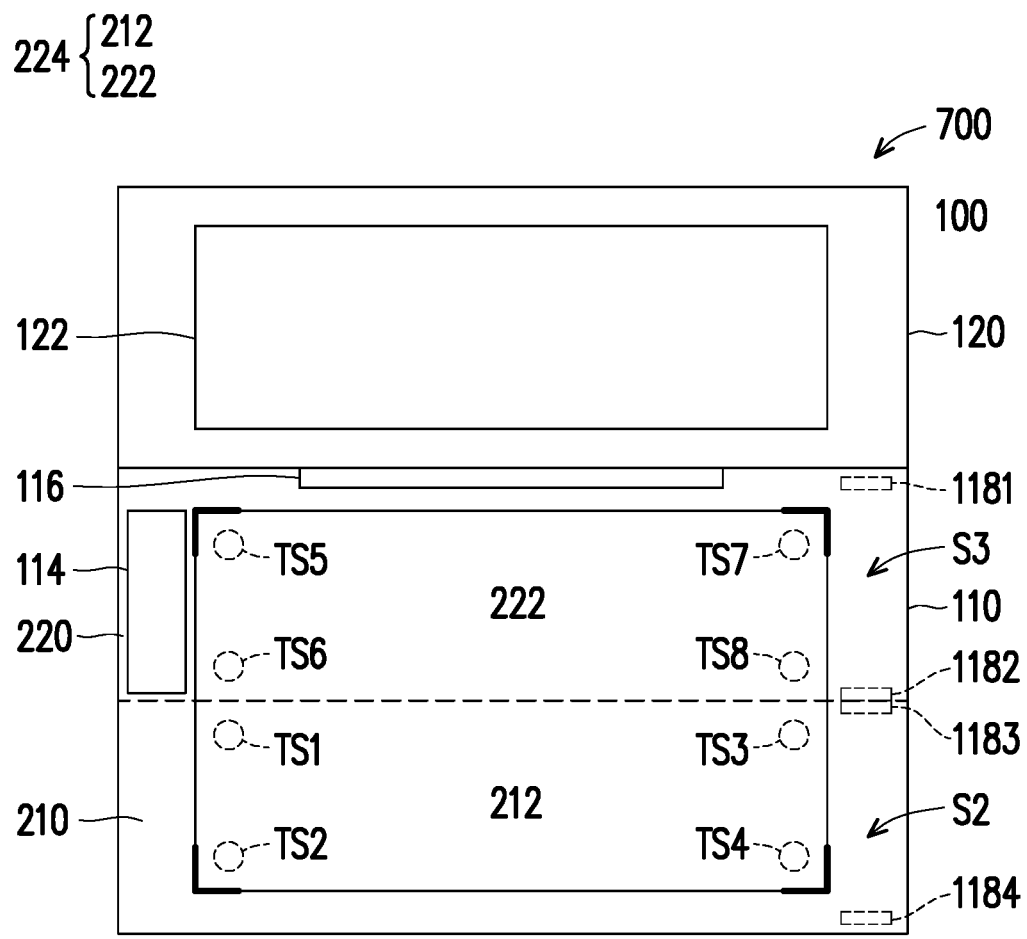
FIG. 7 is a top view of a foldable electronic input device in the unfolded mode in accordance with another embodiment of the invention.
Figure 8:
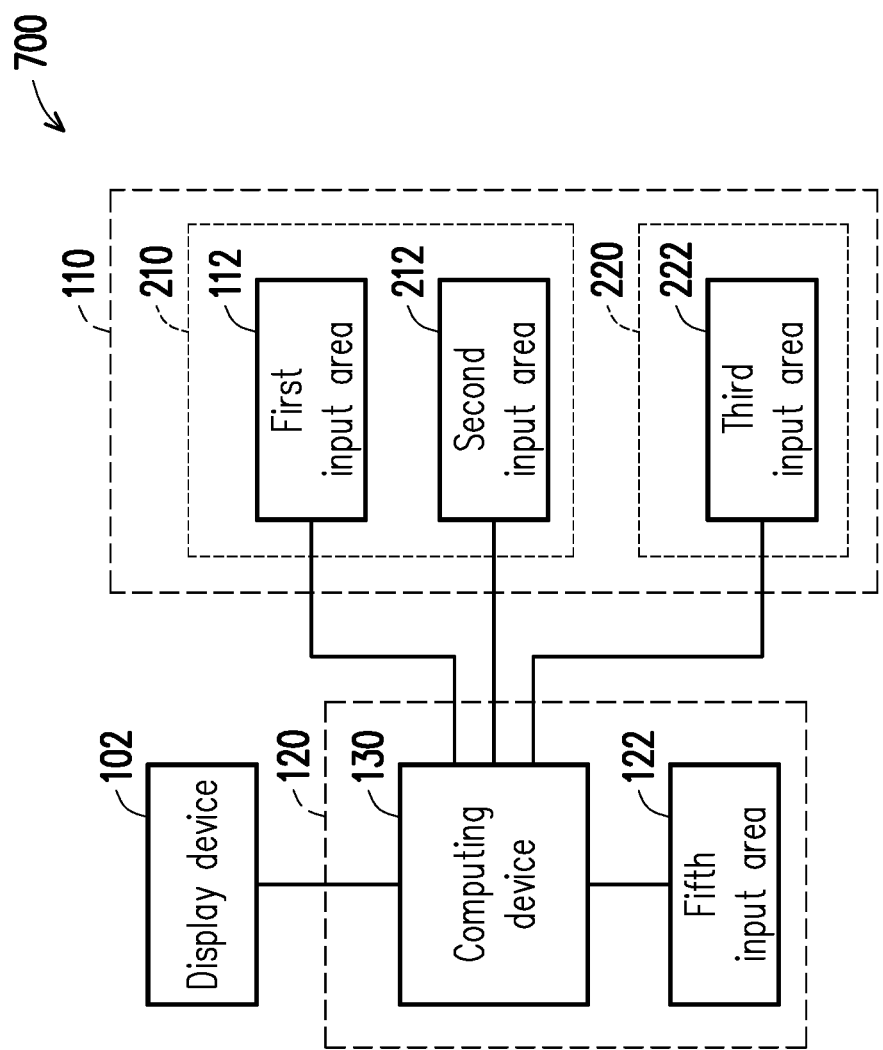
FIG. 8 is a block diagram of the foldable electronic input device in accordance with the embodiment of FIG. 7 of the invention.

FIG. 7 is a top view of a foldable electronic input device in the unfolded mode in accordance to another embodiment of the invention, and FIG. 8 is a block diagram of the foldable electronic input device in accordance with the embodiment of FIG. 7 of the invention. The structure of a foldable electronic input device 700 is similar to that of the foldable electronic input device 100, but the difference is that the touch sensing mode of the fourth input area 224 of the foldable electronic input device 700 is a resistive touch mode or a capacitive touch mode.

Herein, the host portion 120 of the foldable electronic input device 700 does not include the optical touch sensor 124. Instead, the second input area 212 includes a plurality of first touch sensors, and four first touch sensors TS1 to TS4 are taken as an example. The third input area 222 includes a plurality of second touch sensors, and four second touch sensors TS5 to TS8 are taken as an example. The first touch sensors TS1 to TS4 may sense a touch event caused by a touch object (such as the stylus SP in FIG. 1) in the second input area 212 and generate a first touch signal. Similarly, the second touch sensors TS5 to TS8 may also generate a second touch signal to respond to the touch event caused by the stylus SP in the third input area 222.

When the foldable electronic input device 700 is in the unfolded mode, the computing device 130 combines the first touch signal from the second input area 212 and the second touch signal from the third input area 222 to integrate the second input area 212 and the third input area 222 into a touch sensing area as the fourth input area 224.

Therefore, when the range of writing or drawing by the stylus SP spans the second input area 212 and the third input area 222, the computing device 130 combines the first touch signal and the second touch signal as the input signal of the fourth input area 224 to implement a word written by the stylus SP or a pattern drawn thereby. The fourth input area 224 is considered to be one handwriting touchpad rather than two separate handwriting touchpads.

The structural configuration and embodiment of the foldable electronic input device 700 are substantially the same as those of the foldable electronic input device 100, and the details are not repeated herein.

Regarding other touch sensing embodiments of the fourth input area 224, in another embodiment, the surface layer 230 covers the fourth input area 224 and has flexible circuits and sensing components therein. The sensing components in the surface layer 230 may detect a touch event caused by the stylus SP on the surface layer 230 and transmit a sensing result as an input signal to the computing device 130. The input signal received by the computing device 130 directly reflects a complete touch area of the fourth input area 224. The invention does not limit the implementation of the touch sensing of the fourth input area 224.

Based on the above, the invention provides a portable electronic device and a foldable electronic input device. The portable electronic device includes a display device and the foldable electronic input device having a folded mode and an unfolded mode. The foldable electronic input device has at least three input areas: a first input area, a second input area, and a third input area. When the foldable electronic input device is in the folded mode, the second input area and the third input area are stored. When the foldable electronic input device is in the unfolded mode, the second input area and the third input area are spread out and are combined into the fourth input area, so the fourth input area has an extended input area for user operation. When the user does not need such a large input area, the first body and the second body may be folded, so that the size of the foldable electronic input device is reduced, which is convenient for carrying or saving space.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A foldable electronic input device having a folded mode and an unfolded mode and comprising:
 a first body, having a first conductive connector and a first surface and a second surface opposite to the first surface and comprising:
  a first input area, disposed on the first surface; and
  a second input area, disposed on the second surface; and
 a second body, having a second conductive connector and a third surface and comprising:
  a third input area, disposed on the third surface,
 wherein when the foldable electronic input device is in the folded mode, the second body is located directly below the first body and the third surface faces the second surface, and when the folded electronic input device is in the unfolded mode, the first body is located beside the second body, the second surface forms a plane with the third surface, and the second input area and the third input area are combined into a fourth input area to provide a larger input area than the first input area,
 wherein the first input area and the second input area are touch sensing areas, and an entire area of the second input area is larger than an entire area of the first input area,
 wherein a conductive path formed by the first conductive connector and the second conductive connector is determined according to the docking condition of the first conductive connector and the second conductive connector.

2. The foldable electronic input device of claim 1, further comprising:
a third body, having a fourth surface and comprising:
a fifth input area, disposed on the fourth surface,
wherein when the foldable electronic input device is in the folded mode, the first body and the second body are located at a same side of the third body, the first surface is aligned with the fourth surface, and when the foldable electronic input device is in the unfolded mode, the second body is located between the first body and the third body.

3. The foldable electronic input device of claim 2, wherein the first body and the second body are electrically connected to the third body, wherein the third body further comprises:
a computing device, disposed inside the third body and configured to receive and process an input signal inputted by a user via the first input area, the fourth input area, and the fifth input area.

4. The foldable electronic input device of claim 3, wherein the third body further comprises:
an optical touch sensor, configured to detect a touch operation in the fourth input area, wherein the fourth input area is a touch sensing area.

5. The foldable electronic input device of claim 3, wherein the third input area is a touch sensing area, wherein when the foldable electronic input device is in the unfolded mode, the computing device combines a first touch signal from the second input area and a second touch signal from the third input area to integrate the second input area and the third input area into an integrated touch sensing area as the fourth input area.

6. The foldable electronic input device of claim 5, wherein the second input area comprises a plurality of first touch sensors, the third input area comprises a plurality of second touch sensors, the plurality of first touch sensors are configured to generate the first touch signal, and the plurality of second touch sensors are configured to generate the second touch signal.

7. The foldable electronic input device of claim 3, wherein the first body further comprises a first battery, the second body further comprises a second battery, and the first battery and the second battery supply power to the computing device.

8. The foldable electronic input device of claim 7, wherein the first conductive connector and the second conductive connector are docked with each other to connect the first battery with the second battery in series.

9. The foldable electronic input device of claim 3, wherein the fourth input area is a touch sensing area, and the fifth input area is a keyboard area.

10. The foldable electronic input device of claim 1, wherein when the foldable electronic input device is in the folded mode, the first input area is enabled and the second input area and the third input area are disabled, and when the foldable electronic input device is in the unfolded mode, the first input area is disabled and the second input area and the third input area are enabled.

11. The foldable electronic input device of claim 1, wherein the foldable electronic input device determines that the foldable electronic input device is in the folded mode or the unfolded mode according to a connection state between the first connector and the second connector.

12. The foldable electronic input device of claim 1, wherein the fourth input area is a touch sensing area, and the second surface or the third surface further comprises a stylus storage area.

13. The foldable electronic input device of claim 1, wherein the second surface or the third surface further comprises:
a function selection interface, configured to provide a plurality of selective functions.

14. The foldable electronic input device of claim 1, further comprising:
a surface layer, fixedly disposed above the second surface and the third surface and covering the second input area and the third input area, wherein the surface layer forms the fourth input area in a flat connection state when the foldable electronic input device is in the unfolded mode.

15. The foldable electronic input device of claim 14, wherein a material of the surface layer comprises a fiber cloth, a silicone, a rubber, or a flexible display.

16. The foldable electronic input device of claim 14, wherein the first body and the second body are connected to the surface layer and the first body and the second body are connected to each other via the surface layer to be unfolded or folded.

17. The foldable electronic input device of claim 14, further comprising:
a pivoting portion, connected to the first body and the second body and disposed below the surface layer, wherein the first body and the second body are connected to each other via the pivoting portion, so that the first body and the second body are unfolded or folded correspondingly.

18. A portable electronic device, comprising:
a foldable electronic input device, having a folded mode and an unfolded mode and comprising:
a first body, having a first conductive connector and a first surface and a second surface opposite to the first surface and comprising:
a first input area, disposed on the first surface; and
a second input area, disposed on the second surface;
a second body, having a second conductive connector and a third surface and comprising:
a third input area, disposed on the third surface; and
a third body, having a fourth surface and comprising:
a computing device, disposed inside the third body and electrically connected to the first input area, a fourth input area, and a fifth input area, wherein in the unfolded mode, the second surface forms a plane with the third surface, and the second input area and the third input area are combined into the fourth input area to provide a larger input area than the first input area; and
the fifth input area, disposed on the fourth surface,
wherein when the foldable electronic input device is in the folded mode, the second body is located directly below the first body and the third surface faces the second surface, the first body and the second body are located at a same side of the third body, and the first surface is aligned with the fourth surface, and when the foldable electronic input device is in the unfolded mode, the first body is located beside the second body and the second body is located between the first body and the third body, wherein the first input area and the second input area are touch sensing areas, and an entire area of the second input area is larger than an entire area of the first input area; and a display device, coupled to the foldable electronic input device and electrically connected to the computing device, wherein a conductive path formed by the first conductive connector and the second conductive connector is determined according to the docking condition of the first conductive connector and the second conductive connector.

\* \* \* \* \*